United States Patent
Almblad et al.

(10) Patent No.: US 8,685,477 B2
(45) Date of Patent: Apr. 1, 2014

(54) METHOD FOR BLENDING A BEVERAGE IN A SINGLE SERVING CUP

(75) Inventors: Robert Almblad, Tarpon Springs, FL (US); Jay Almblad, Munedelin, IL (US)

(73) Assignee: Enodis Corporation, New Port Richey, FL (US)

( * ) Notice: Subject to any disclaimer, the term of this patent is extended or adjusted under 35 U.S.C. 154(b) by 380 days.

(21) Appl. No.: 12/009,221

(22) Filed: Jan. 17, 2008

(65) Prior Publication Data
US 2009/0186141 A1    Jul. 23, 2009

(51) Int. Cl.
*B01F 7/16* (2006.01)
*A23G 9/12* (2006.01)

(52) U.S. Cl.
USPC ............ 426/66; 426/590; 426/518; 426/519; 426/524; 366/289

(58) Field of Classification Search
CPC .......... A23G 9/045; A23G 9/12; A23G 9/25; A23V 2300/26; B01F 3/1221; B01F 7/1605; B01F 7/161; B01F 2215/0021
USPC ................... 426/66, 231, 590, 519, 524, 518; 366/197, 289
See application file for complete search history.

(56) References Cited

U.S. PATENT DOCUMENTS

| | | | | |
|---|---|---|---|---|
| 2,008,106 A * | 7/1935 | Lawrence | ...................... | 366/197 |
| 2,653,733 A | 9/1953 | Rudd et al. | ..................... | 222/145 |
| 2,855,007 A | 10/1958 | Erickson et al. | ................ | 99/275 |
| 3,101,872 A | 8/1963 | Dickinson | ..................... | 222/197 |
| 3,154,123 A * | 10/1964 | Tomlinson | ................. | 241/101.6 |
| 3,156,103 A * | 11/1964 | Ross | ................................ | 62/331 |
| 3,272,388 A | 9/1966 | Whitmore | | |
| 3,295,997 A * | 1/1967 | Tomlinson et al. | ............. | 241/34 |
| 3,460,716 A | 8/1969 | Thomas | | |
| 3,460,717 A | 8/1969 | Thomas | | |
| 3,505,075 A * | 4/1970 | Black | ............................. | 426/318 |
| 3,615,673 A * | 10/1971 | Black et al. | ................... | 426/477 |
| 3,630,045 A * | 12/1971 | Lunde | ............................. | 62/320 |
| 3,704,599 A * | 12/1972 | Darby et al. | .................... | 62/354 |
| 3,987,211 A | 10/1976 | Dunn et al. | ................... | 426/551 |

(Continued)

FOREIGN PATENT DOCUMENTS

EP       1690481       8/2006
JP       2004 26246    11/2004

OTHER PUBLICATIONS

Extended European Search Report mailed Dec. 21, 2010 in the corresponding International Application No. PCT/US2009/000247.

(Continued)

*Primary Examiner* — Drew E Becker
(74) *Attorney, Agent, or Firm* — Ohlandt, Greeley, Ruggiero & Perle, LLP

(57) ABSTRACT

A method and apparatus for preparing a single serving of a frozen slurry beverage in a disposable drink container or cup by preparing a supply of fine frozen particles of water in the form of ice flakes and/or ice nuggets of compressed ice flakes, depositing a predetermined quantity or amount of the fine frozen particles of partially frozen water into a disposable single serving drinking cup or container, dispensing or adding a predetermined quantity or amount of flavored liquid beverage mix into the disposable single serving drinking cup or container and blending the fine frozen particles of partially frozen water and the flavored liquid beverage mix into a substantially uniform frozen slurry beverage of a predetermined consistency.

12 Claims, 3 Drawing Sheets

(56) References Cited

U.S. PATENT DOCUMENTS

| | | | |
|---|---|---|---|
| 4,083,462 A | 4/1978 | Teske et al. .................. 214/17 D |
| 4,276,750 A * | 7/1981 | Kawasumi ...................... 62/137 |
| 4,392,588 A | 7/1983 | Scalera ...................... 222/129.4 |
| 4,528,824 A * | 7/1985 | Herbert .......................... 62/331 |
| 4,531,380 A | 7/1985 | Hagen ............................ 62/320 |
| 4,610,145 A | 9/1986 | Arzberger et al. ............. 62/127 |
| 4,638,875 A | 1/1987 | Murray ............................ 177/1 |
| 4,653,281 A | 3/1987 | Van der Veer .................... 62/71 |
| 4,681,030 A * | 7/1987 | Herbert .......................... 99/484 |
| 4,708,487 A * | 11/1987 | Marshall ..................... 366/206 |
| 4,745,773 A | 5/1988 | Ando .............................. 62/320 |
| 4,790,240 A | 12/1988 | Henn et al. ...................... 99/282 |
| 4,932,223 A | 6/1990 | Paul et al. ....................... 62/354 |
| 4,941,593 A | 7/1990 | Hicks et al. ................... 222/148 |
| 4,962,866 A | 10/1990 | Phillips ............................ 221/8 |
| 5,036,892 A | 8/1991 | Stembridge et al. ............... 62/1 |
| 5,067,819 A | 11/1991 | Heinhold et al. ............. 366/138 |
| 5,068,116 A | 11/1991 | Gibney et al. ................. 426/231 |
| 5,104,007 A * | 4/1992 | Utter .......................... 222/146.6 |
| 5,150,967 A * | 9/1992 | Neilson et al. ................ 366/206 |
| 5,192,131 A | 3/1993 | Hatfield ........................ 366/308 |
| 5,208,050 A * | 5/1993 | Ney .............................. 425/202 |
| 5,280,845 A | 1/1994 | Leight ............................ 221/2 |
| 5,323,691 A | 6/1994 | Reese et al. ...................... 99/275 |
| 5,350,082 A | 9/1994 | Kiriakides et al. ................ 141/1 |
| 5,439,289 A * | 8/1995 | Neilson ......................... 366/207 |
| 5,549,219 A | 8/1996 | Lancaster ......................... 221/1 |
| 5,619,901 A | 4/1997 | Reese et al. ...................... 99/275 |
| 5,683,011 A | 11/1997 | Miliani ........................... 222/56 |
| 5,690,253 A | 11/1997 | LaFleur ........................ 222/102 |
| 5,698,247 A * | 12/1997 | Hall ............................... 426/66 |
| 5,778,761 A | 7/1998 | Miller ............................. 99/275 |
| 5,797,519 A | 8/1998 | Schroeder et al. .......... 222/129.1 |
| 5,803,377 A * | 9/1998 | Farrell ............................ 241/36 |
| 5,833,362 A | 11/1998 | Shepard ........................ 366/111 |
| 5,839,291 A | 11/1998 | Chang ............................ 62/126 |
| 5,863,118 A | 1/1999 | Ackels et al. ................. 366/129 |
| 5,910,164 A * | 6/1999 | Snelling et al. ................. 62/344 |
| 5,911,749 A | 6/1999 | Sugie ............................. 62/354 |
| 5,934,516 A | 8/1999 | Strycharskie et al. ......... 222/158 |
| 5,960,701 A | 10/1999 | Reese et al. ...................... 99/275 |
| 5,967,367 A | 10/1999 | Orsborn ......................... 222/30 |
| 6,041,961 A * | 3/2000 | Farrell ........................... 220/608 |
| 6,068,875 A | 5/2000 | Miller et al. ................... 426/565 |
| 6,196,712 B1 | 3/2001 | Elm ............................. 366/197 |
| 6,202,894 B1 | 3/2001 | Struminski et al. .......... 222/129.3 |
| 6,269,973 B1 | 8/2001 | Bennett et al. ..................... 221/1 |
| 6,283,627 B1 | 9/2001 | Fromm ......................... 366/260 |
| 6,293,691 B1 | 9/2001 | Rebordosa et al. ........... 366/129 |
| 6,338,569 B1 * | 1/2002 | McGill ......................... 366/144 |
| 6,490,872 B1 | 12/2002 | Beck et al. ...................... 62/303 |
| 6,607,096 B2 | 8/2003 | Glass et al. ................... 222/100 |
| 6,616,323 B2 * | 9/2003 | McGill ......................... 366/201 |
| 6,684,646 B2 | 2/2004 | Vouté et al. ...................... 62/66 |
| 6,689,410 B2 | 2/2004 | Gerber |
| 6,705,356 B2 | 3/2004 | Barton et al. ................... 141/2 |
| 6,722,675 B2 | 4/2004 | Bidwell ........................ 280/89 |
| 6,730,348 B2 * | 5/2004 | Miller et al. ................... 426/565 |
| 6,772,675 B2 * | 8/2004 | Ervin ............................. 99/275 |
| 6,945,157 B2 * | 9/2005 | Brown et al. .................... 99/275 |
| D526,170 S | 8/2006 | Gugni ............................ D7/706 |
| 7,175,046 B2 | 2/2007 | Yao ............................... 221/265 |
| 7,207,506 B1 | 4/2007 | Dickson, Jr. et al. ........... 241/21 |
| 7,237,691 B2 | 7/2007 | Danby et al. ................... 222/103 |
| 7,278,275 B2 | 10/2007 | Voglewede et al. ............. 62/320 |
| D555,678 S | 11/2007 | Broerson et al. ............... D15/89 |
| 7,325,485 B2 | 2/2008 | Carhuff et al. ................. 99/452 |
| 7,383,966 B2 | 6/2008 | Ziesel .......................... 222/100 |
| 7,475,795 B2 | 1/2009 | Faller et al. ..................... 222/95 |
| 7,614,524 B2 | 11/2009 | Girard et al. ............... 222/129.4 |
| 7,665,398 B2 * | 2/2010 | Gerber .......................... 99/455 |
| 7,748,571 B2 | 7/2010 | Goff et al. .................. 222/146.6 |
| 2002/0194999 A1 * | 12/2002 | Ervin ............................. 99/275 |
| 2005/0183426 A1 | 8/2005 | Learned ....................... 426/565 |
| 2005/0242120 A1 * | 11/2005 | Sato et al. .................. 222/146.6 |
| 2007/0084888 A1 | 4/2007 | Santos et al. |
| 2007/0095859 A1 | 5/2007 | Maser et al. .................. 222/148 |
| 2007/0205220 A1 | 9/2007 | Rudick et al. ............. 222/129.4 |
| 2007/0205221 A1 | 9/2007 | Carpenter et al. .......... 222/129.4 |
| 2007/0289991 A1 | 12/2007 | Jensen .............................. 222/1 |
| 2008/0089983 A1 * | 4/2008 | Coste ............................ 426/106 |
| 2008/0093382 A1 | 4/2008 | Sher et al. .................. 222/129.1 |
| 2008/0279040 A1 * | 11/2008 | Neilson ...................... 366/176.1 |
| 2010/0139493 A1 * | 6/2010 | Nevarez et al. .................. 99/275 |
| 2010/0145522 A1 * | 6/2010 | Claesson et al. ............. 700/265 |
| 2010/0318225 A1 * | 12/2010 | Claesson et al. ............. 700/265 |
| 2010/0323071 A1 * | 12/2010 | Nevarez et al. ............... 426/231 |

OTHER PUBLICATIONS

International Search Report mailed Mar. 2, 2009 in the corresponding International Application No. PCT/US2009/000247.
The Second Office Action dated May 11, 2012 from Chinese Application No. 200980102539.5.
International Search Report and Written Opinion Dated Dec. 21, 2010 From International Application No. PCT/US2010/054317.
International Preliminary Report on Patentability Dated Mar. 30, 2011 From International Application No. PCT/US2009/67227.
International Search Report and Written Opinion Dated Feb. 17, 2010 From International Application No. PCT/US2009/67227.
International Preliminary Report on Patentability Dated Nov. 15, 2010 From International Application No. PCT/US2009/67225.
International Search Report and Written Opinion Dated Feb. 4, 2010 From International Application No. PCT/US2009/67225.
International Search Report and Written Opinion Dated Feb. 4, 2010 From International Application No. PCT/US2009/67226.
International Search Report and Written Opinion Dated Feb. 4, 2010 From International Application No. PCT/US2009/67230.
International Search Report and Written Opinion Dated Feb. 4, 2010 From International Application No. PCT/US2009/67229.
International Search Report and Written Opinion Dated Jan. 26, 2010 From International Application No. PCT/US2009/67223.
International Preliminary Examination Report Dated Mar. 28, 2011 From International Application No. PCT/US2009/67223.
International Preliminary Report on Patentability Dated Feb. 10, 2011 From International Application No. PCT/US2009/67230.
International Preliminary Report on Patentability Dated Dec. 4, 2011 From International Application No. PCT/US2010/54317.
Rejection issued by Chinese Patent Office on Mar. 29, 2013 for Chinese Patent Application No. 200980102539.5 with English translation, 10 pages.

* cited by examiner

METHOD FOR BLENDING A BEVERAGE IN A SINGLE SERVING CUP

BACKGROUND OF THE INVENTION

1. Field of the Invention

A method of preparing a frozen beverage by blending a slug or nugget of ice particles and a flavor ingredient in a disposable vessel.

2. Description of the Prior Art

In recent years, the popularity of "frozen drinks" has been increasing dramatically. These drinks typically consist of a mixture of flavorings, fruit puree, coffee, liquor, dairy products and/or other ingredients and a finely-divided ice/water mixture that has the consistency of a thin paste. This type of drink is often called a Smoothie at branded Jamba Juice or a "slush" drink at branded 7/11 or a blended coffee like branded Starbuck's Frapachino.

Historically, from the 1940's a frozen drink was made by placing the ingredients of the drink, including ice in the form of cubes or crushed ice, in a blender pitcher like the branded Waring blender. The blender is then operated for the considerable amount of time required to reduce the ice to a finely-divided state. The mixture is then transferred to a drinking glass or disposable cup for consumption. Then in 1986 John Herbert, U.S. Pat. No. 4,681,030, invented a better way of doing this by first shaving ice into a blender and then blending the ingredients. This increased the speed and consistency of the final ice slurry because the shaved ice is made by pressing ice against a rotating blade, which was far more efficient than having ice cubes bouncing around in a blender and only making contact with blender blade after the ice cubes fall through the solution only to bounced back up again after hitting the blade. In particular, U.S. Pat. No. 4,681,030 shows an apparatus for preparing frozen drinks, in which an ice-shaving machine is combined with a blender in a single unit, the output of the ice-shaving machine being discharged directly into the blender cup. The ice-shaver and the blender are electrically wired together, and programmable timing means are provided to permit selective control of the periods of time over which the ice-shaver and blender operate, so that, by the momentary activation of a single switch button, the apparatus may be activated and will automatically deliver the appropriate amount of ice to the blender cup and will turn on the blender at the appropriate time and for the appropriate amount of time.

In 1994 various inventors, such as Reese and Hanson, U.S. Pat. No. 5,619,901, added automatic dispensers of flavorings "to provide, in a beverage dispensing machine having a blender, a portion control means to dispense a precise predetermined amount of the drink mix and shaved ice, respectively, thereby avoiding waste and inconsistent flavors. Specifically, U.S. Pat. No. 5,619,901 relates to a beverage dispensing machine assuring precise portion control of the respective drink mixes being dispensed, and the precise amount is adjustable within certain limits. The drink mixes are in respective beverage receptacles (or drink tubes) arranged in a side-by-side relationship with respect to each other, and a plurality of selection buttons are disposed directly below the receptacles in substantial vertical alignment therewith. A counter and a interrupt button, respectively, are also provided on the control panel. The level of the drink mixes as well as the ice in the reservoir, are readily visible at all times. Upon initiation of the blending cycle, the blender motor is started, and after a first time delay, the drink mix is discharged into the blender for a first time period. Upon a second time delay following initiation of the discharge of the mix, the ice shaver motor continues for a second time period; and the blender motor continues after discharge of the mix and delivery of the shaved ice.

U.S. Pat. No. 3,505,075 discloses a method and apparatus for preparing a frozen slush beverage where ice in chunk form is mixed with flavoring agent under conditions causing carbon dioxide part of the gas to be absorbed by the mixture producing the frozen beverage.

U.S. Pat. No. 3,615,673 describes a disposable cup containing beverage ingredients including ice placed within a rigid receptacle. A closure is moved into the open top of the cup sealing its interior from the ambient atmosphere. A cutter carried by the closure is rotated within the cup to agitate the ingredients while carbon dioxide is forced into the cup through the closure at a pressure which would normally deform the cup walls. Following the agitation, the closure lifts the cup under the influence of the pressurized carbon dioxide.

U.S. Pat. No. 4,932,223 shows an auger-type ice-making apparatus includes a new and improved auger or auger assembly having one or more generally spiral flight portions with one or more grooves formed transversely across the outer edges of the flight portions. The grooves interrupt the generally spirally-extending contact between the outer auger edges and the inner surface of an evaporator housing, thus reducing the area of contact therebetween and, as a result, reducing the load on the auger bearings. The grooves also provide a stress-relieved area on the flight portion during scraping of ice particles from the inner surface of the evaporator and tend to balance the forces on the auger bearings.

U.S. Pat. No. 4,745,773 relates to an apparatus for making a soft ice-drink comprising an ice mechanism including a shaver casing having a slit to which a shaving blade is exposed and a shaved ice discharge chute, rotatable blades, provided within the shaver casing, for cooperating with the shaving blade to shave ice blocks charged into the shaver casing, and a mixing mechanism under the ice shaving mechanism, including rotary blades, rotatably supported within a container disposed beneath the shaved ice discharge chute, for mixing together a liquid material such as a syrup present within the container and shaved ice pieces discharged into the container and smashing the shaved ice pieces into granules of ice.

U.S. Pat. No. 5,803,377 teaches a frozen drink machine and a method for making frozen drinks from a frozen substance which has been frozen into a cup. The cup contains a frozen substance positioned in a cup support located in the frozen drink machine. A rotatable blade having features for grinding the frozen substance and for aerating the ground frozen substance is lowered into the cup, grinding the frozen substance while a liquid is simultaneously introduced into the cup. In an alternative embodiment, a second blade is provided which incorporates air into the liquid before the liquid is introduced into the cup.

U.S. Pat. No. 5,911,749 relates to an auger-type ice maker comprising partitions projectingly provided on the outer periphery of a pressing head which has been inserted and fixed to the upper portion of an ice-making cylinder 1, wherein fixed blades are formed at the lower portion of the partitions so as to be offset in the radial direction, and wherein the tip of the inner circumference side portion thereof is situated above the greater diameter portion of the auger provided with a spiral blade. In the above construction, the offset corner portion is provided with a curvature. Accordingly, ice can be prevented from being compressed to and adhering to the corner portion. Thus, the transporting resistance of ice at the lower portion of the partitions projectingly provided to the outer periphery of the pressing head can be reduced, thereby preventing decreasing in ice-making capabilities and abnormal sounds or vibrations being emitted owing to ice jamming occurring.

U.S. Pat. No. 6,730,348 shows a method for preparing a flavored confection using a disposable container of a neutral-flavored mix, transferred from a storage freezer to a tempering freezer. The container is removed from the tempering freezer, and a selected syrup is pumped from a carton into the disposable container for blending while the mix remains chilled.

U.S. Pat. No. 6,772,675 discloses a frozen beverage mixing unit has a hollow housing with an open bottom and a shaving disc with a cutting knife is rotationally mounted inside the housing. A piston moves above the shaving disc pushing a frozen product into a contact with the cutting blades of the shaving disc. A plurality of pumps deliver a pre-determined amount of a selected additive, such as alcohol, syrup, carbonated water or water, on top of the shaving disc to mix with the ice crystals created by the shaved frozen product. The additive is mixed with the shaved frozen product in a mixing container placed below the shaving disc.

U.S. Pat. No. 6,068,875 relates to a method for preparing a flavored slurried confection includes the use of a disposable serving container holding an individual serving of a neutral flavored mix which has a freezing point temperature lower than normally found for that of water. A large supply of the mix filled containers is stored in a storage freezer for maintaining the neutral flavored mix at a storage temperature, such as is typical of a food storage freezer for a restaurant. A desired quantity of the mix filled containers is then transferred from the storage freezer to a tempering freezer, generally close to a preparation and serving area, for maintaining the neutral flavored mix at a desirable blending temperature. The mix filled container is then removed from the tempering freezer for preparation of a flavored confection, such as a flavored shake. In preparing the flavored confection, a small quantity of a selected syrup is pumped from a selected bag-in-the-box styled carton into the mix filled container for blending the selected syrup with the neutral flavored mix while the mix remains chilled at the blending temperature. The small quantity of syrup adds provide the selected flavor to the neutral flavored mix for forming the flavored slurried confection which is then served within the disposable serving container.

U.S. Pat. No. 7,278,275 teaches a mechanism for dispensing ice in each of three selected forms, namely, cubed, crushed and shaved. This mechanism includes a reservoir arranged to hold a supply of ice cubes, a dispensing zone, a delivery mechanism arranged for dispensing ice cubes from said reservoir to said dispensing zone, an ice crushing mechanism located in said dispensing zone arranged to selectively crush ice, an ice shaving mechanism located in said dispensing zone arranged to selectively shave ice, and a control mechanism arranged to selectively activate said ice crushing mechanism and said ice shaving mechanism upon receipt of an appropriate input from a user.

Additional examples of the prior art are found in U.S. Pat. No. 2,855,007; U.S. Pat. No. 5,192,131; U.S. Pat. No. 5,619,901; U.S. Pat. No. 5,833,362; U.S. Pat. No. 5,863,118; U.S. Pat. No. 6,196,712; U.S. Pat. No. 6,283,627; U.S. Pat. No. 6,293,691; U.S. Pat. No. 6,338,569; U.S. Pat. No. 6,616,323: U.S. Pat. No. 6,945,157 and U.S. 2002/0194999.

Many of these devices automatically delivered the ingredients. However, one of the principal problems with such method of making frozen drinks is the time and effort it takes to pour the drink out of the blender and into a serving glass or disposable cup and then having to thoroughly wash the blender. Also, if the blender is not washed properly because they are quickly trying to serve another customer who is waiting for a strawberry drink, but just after a chocolate drink is made, then it is easy to get cross contamination where there is chocolate inside the strawberry drink. The problem of washing a blender picture is greater than most vessels because there is a lot of surface area in the picture when compared to the size of the drink being served and also, because there is a blade inside the picture, there are many nooks and crannies that can "hold onto" the food.

A further problem associated with the conventional method arises from the amount of time consumed delivering drinks in serial fashion. If there is only 1 blender and 10 drinks are ordered, then they have to be made one after the other and little simultaneous actions can take place. So if it takes 1 minute to make a drink, it will take 10 minutes to make 10 drinks.

A further problem associated with the conventional method arises from the fact the staff must only do one thing when they make the drink, which is make the drink.

They cannot "multi-task" and help another customers while they are making the drinks because they have to "tend" the machine by emptying and washing blenders, pouring drinks, etc. in other words, if they stop tending the machine, then the drink making process will stop.

It is therefore an object of the present invention to provide apparatus which can make frozen drinks quickly and efficiently and to do so in an automatic fashion directly in the serving cup without the use of a blender.

Various attempts have been made to blend inside a disposable cup, but the problem has been that the cup is too big, so the customer feels he has been cheated with a ⅔ cup of drink. The solution to this was to put a steel ring around the top of the cup to temporarily extend the height of the cup. The problem with this is that the metal ring needs to be washed or it will cause cross contamination and so on.

In addition, attempts have been made to blend inside a disposable cup such as Miller, U.S. Pat. No. 6,068,875 where he blends a drink that already has a neutral base material inside the cup and his machine is used to add syrups and flavorings to the disposable cup. However, this requires that a large storage of pre-filled cups be kept in a frozen state at the point of delivery. This can cause an inventory problem in the stores. Generally there is limited space in the retail area, therefore, only a few cups can be held in this area without consuming too much space. In addition, the refrigerated walk-in freezers are usually crowded with other products. Although there are many machines that use a pre-filled cup from a factory and the blending machine is used to finish-off the drink with the addition of either syrup, water or heat, they all have the problem of taking up refrigerated inventory space in a retail store.

SUMMARY OF THE INVENTION

The present invention relates to a method and apparatus for preparing a single serving of a frozen slurry beverage in a disposable drink container or cup.

The apparatus for preparing a single serving of a flavored frozen slurry beverage comprises an ice making device including an ice dispensing station and ice dispensing nozzle to supply fine frozen particles of water in the form of ice flakes and/or ice nuggets of compressed ice flakes, a liquid beverage mix dispensing nozzle to supply a flavored liquid beverage mix and a beverage blending device including a beverage blending station and blender to blend the fine frozen particles of water and the flavored liquid beverage mix into a substantially uniform frozen slurry beverage of a predetermined consistency.

When in the form of ice flakes, the fine frozen particles of water of the present invention comprises from about 81 percent or frozen water to about 89 percent ice or frozen water by weight with the remainder unfrozen water. When in the form of compressed ice flakes or ice nuggets, the fine frozen particles of water comprises from about 89 percent ice or frozen water to about 97 percent ice or frozen water by weight with the remaining unfrozen water.

The method of the present invention comprises the steps of creating fine frozen particles of water; placing a disposable drink container or cup on the ice dispensing station beneath the ice dispenser nozzle; dispensing a predetermined quantity or amount of fine frozen particles of water from the ice dispensing nozzle into the disposable drink container or cup; removing the disposable drinking container or cup containing the predetermined quantity or amount of fine frozen particles of water from the ice dispensing station; placing the disposable drink container or cup containing the predetermined quantity or amount of fine frozen particles of water on the liquid beverage mix station beneath the liquid beverage mix dispensing nozzle; dispensing a predetermined quantity or amount of flavored liquid beverage mix from the liquid beverage mix dispensing nozzle into the disposable drink container or cup containing the predetermined quantity or amount of fine frozen particles of water; removing the disposable drink container or cup containing the unmixed predetermined quantities or amounts of fine frozen particles of water and flavored liquid beverage mix from the liquid beverage mix station; placing the disposable drink container or cup containing the unmixed predetermined quantities or amounts of fine frozen particles of water and flavored liquid beverage mix on the beverage blending station of the beverage blending device; lowering the rotating blender blade of the beverage blending device into the interior of the disposable drink container or cup and into the unmixed predetermined quantities or amounts of fine frozen particles of water and flavored liquid beverage mix; raising the rotating blender blade of the beverage blending device above the disposable drink container or cup containing the substantially uniform frozen slurry beverage of a predetermined consistency; and removing the disposable drink container or cup with the substantially uniform frozen slurry beverage from the beverage blending station of the beverage blending device.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a method and apparatus for preparing a single serving of a frozen slurry beverage in a disposable drink container or cup. The figures and descriptions depict and describe an exemplary preferred embodiment of the present invention for purposes of illustration. One skilled in the art will readily recognize that the principles of the instant invention are equally applicable to other methods and types of apparatuses.

Figure 1:
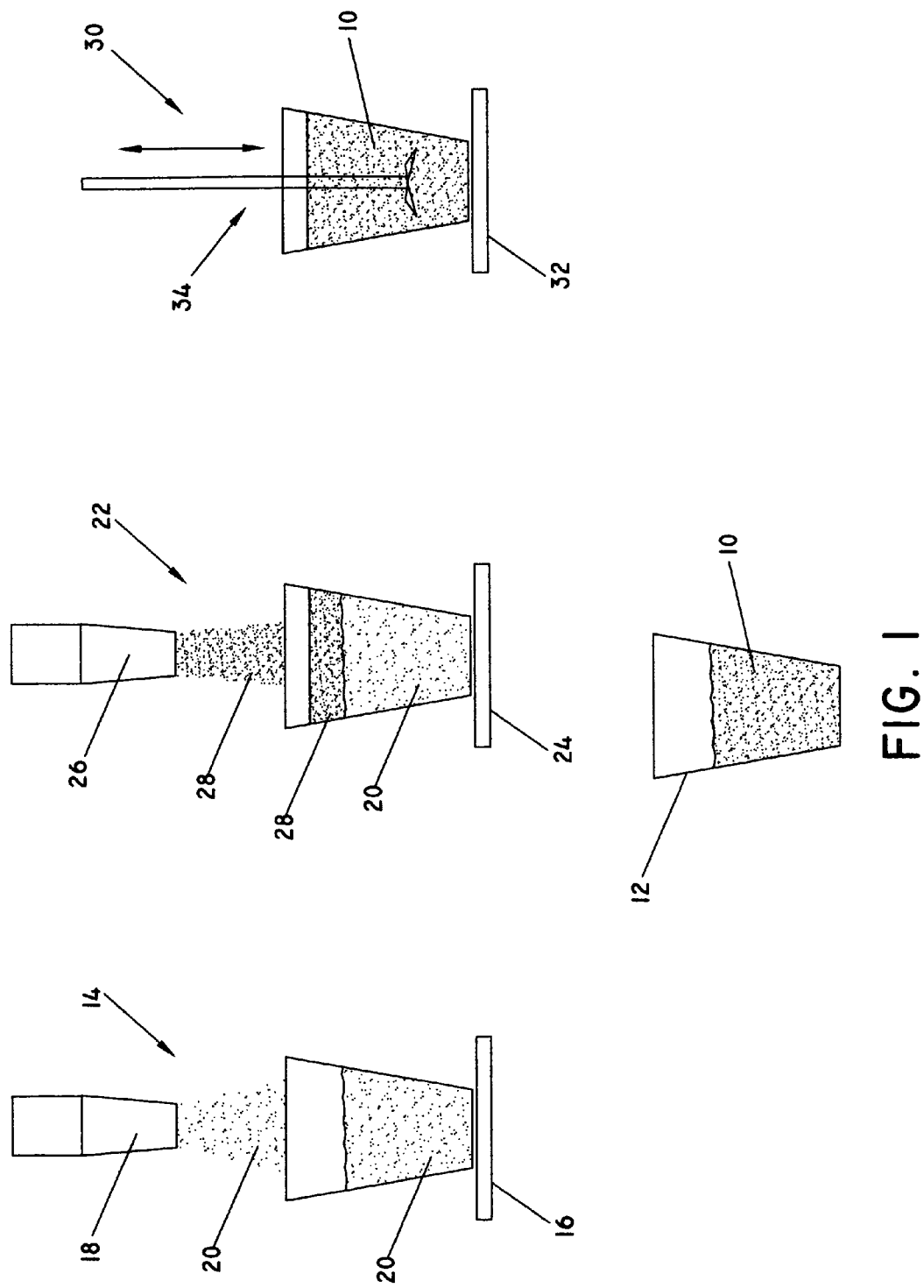
FIG. 1 is a schematic of the steps of the method of the present invention.

FIG. 1 is a schematic of the apparatus for preparing a single serving of a flavored frozen slurry beverage 10 in a disposable drink container or cup 12 comprising an ice making device generally indicated as 14 including an ice dispensing station and ice dispensing nozzle indicated as 16 and 18 respectively to supply fine frozen particles of water 20 in the form of ice flakes and/or ice nuggets of compressed ice flakes, a liquid beverage mix device 22 including a liquid beverage mix station and liquid beverage mix dispensing nozzle indicated as 24 and 26 respectively to supply a flavored liquid beverage mix 28 and a beverage blending device generally indicated as 30 including a beverage blending station and blender indicated as 32 and 34 to blend the fine frozen particles of water 20 and the flavored liquid beverage mix 28 into a substantially uniform frozen slurry beverage 10 of a predetermined consistency.

When in the form of ice flakes, the fine frozen particles of water of the present invention comprises from about 81 percent ice or frozen water to about 89 percent ice or frozen water by weight with the remainder unfrozen water. Preferably, the ice flakes comprise about 85 percent ice or frozen water by weight with the remainder unfrozen water. When in the form of compressed ice flakes or ice nuggets, the fine frozen particles of water comprises from about 89 percent ice or frozen water to about 97 percent ice or frozen water by weight with the remaining unfrozen water. Preferably, the compressed ice flakes comprise about 93 percent ice or frozen water by weight with the remainder unfrozen water.

Figure 2:
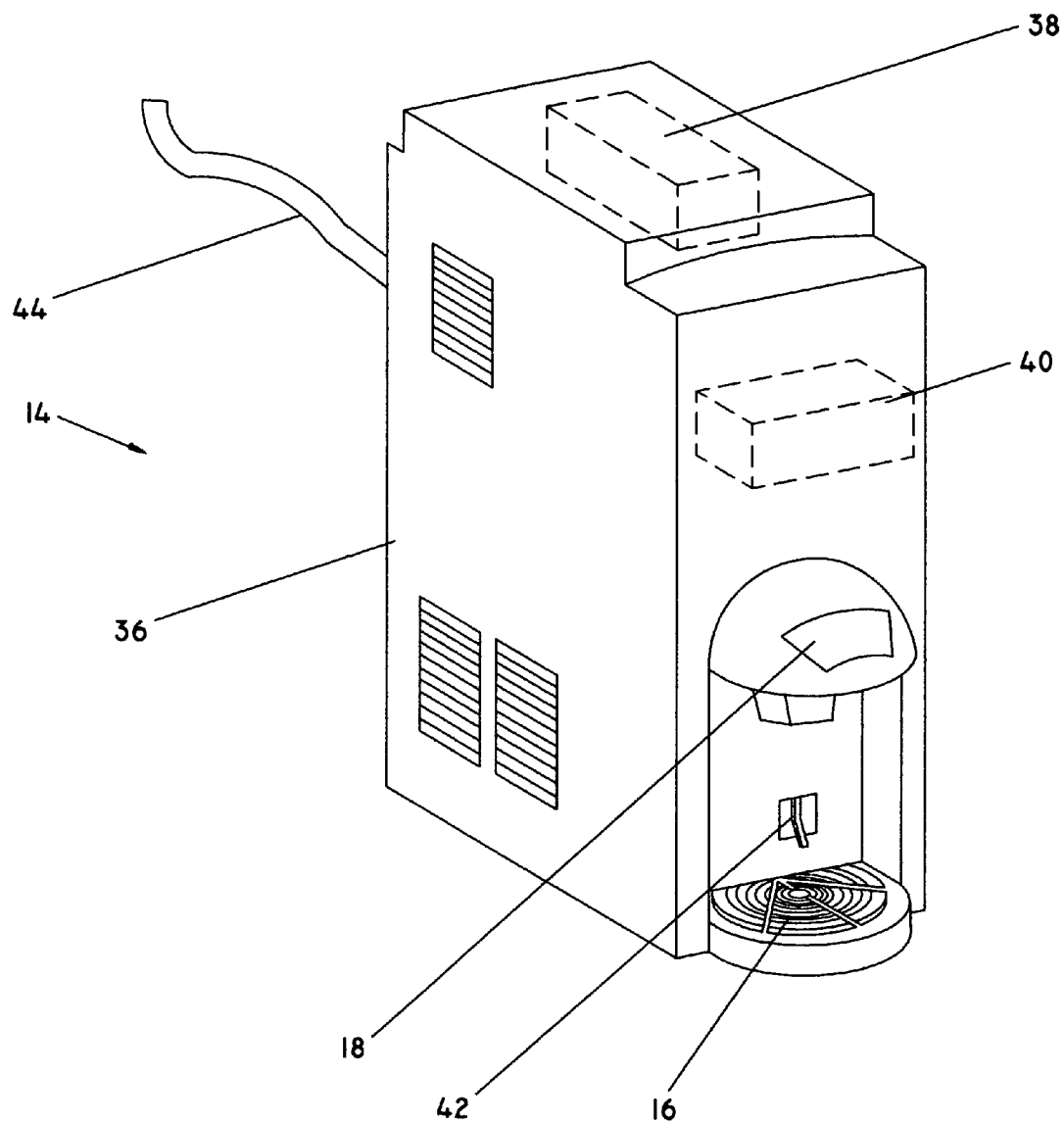
FIG. 2 is a perspective view of a ice making device for use with the present invention.

The ice making device 14 may comprise an ice making machine as disclosed in U.S. Pat. No. 4,932,223 or U.S. Pat. No. 5,911,749. Each such apparatus is capable of producing ice flakes and compressing ice flakes into ice nuggets. FIG. 2 shows a commercial version of the Scotsman ice maker disclosed in the '223 patent. The ice making device 14 comprises an enclosure or housing 36 to house an ice auger 38 within the upper portion thereof and an ice compressor 40 disposed to receive ice flakes from the ice auger 38 to form ice nuggets from the ice flakes. The ice dispensing nozzle 18 is attached to the front of the enclosure or housing 36 to receive either ice flakes or ice nuggets produced by the ice making device 14 and to dispense the ice flakes or ice nuggets into a disposable drink container or cup 12 placed on the ice dispensing station 16. An actuator or switch 42 is mounted to the front of the enclosure or housing 36 to selectively dispense the fine frozen particles of water from the ice dispensing nozzle 18 when actuated or pressed. Water is supplied to the ice making device 14 from a water source (not shown) to the ice forming assembly (not shown) of the ice making device 14 through a water supply conduit 44.

The liquid beverage mix device 22 including the liquid beverage mix station 24 and liquid beverage mix dispenser nozzle 26 may comprise a liquid beverage mix dispensing apparatus capable of dispensing a single flavor liquid beverage mix or multiple flavor liquid beverage mixes similar to the machine shown in U.S. Pat. No. 5,619,901 to supply the flavored liquid beverage mix 28 from the liquid beverage mix dispensing nozzle 26 to the disposable drink container or cup 12 container with the fine particles of frozen water 20 therein placed on the liquid beverage mix station 24.

Figure 3:
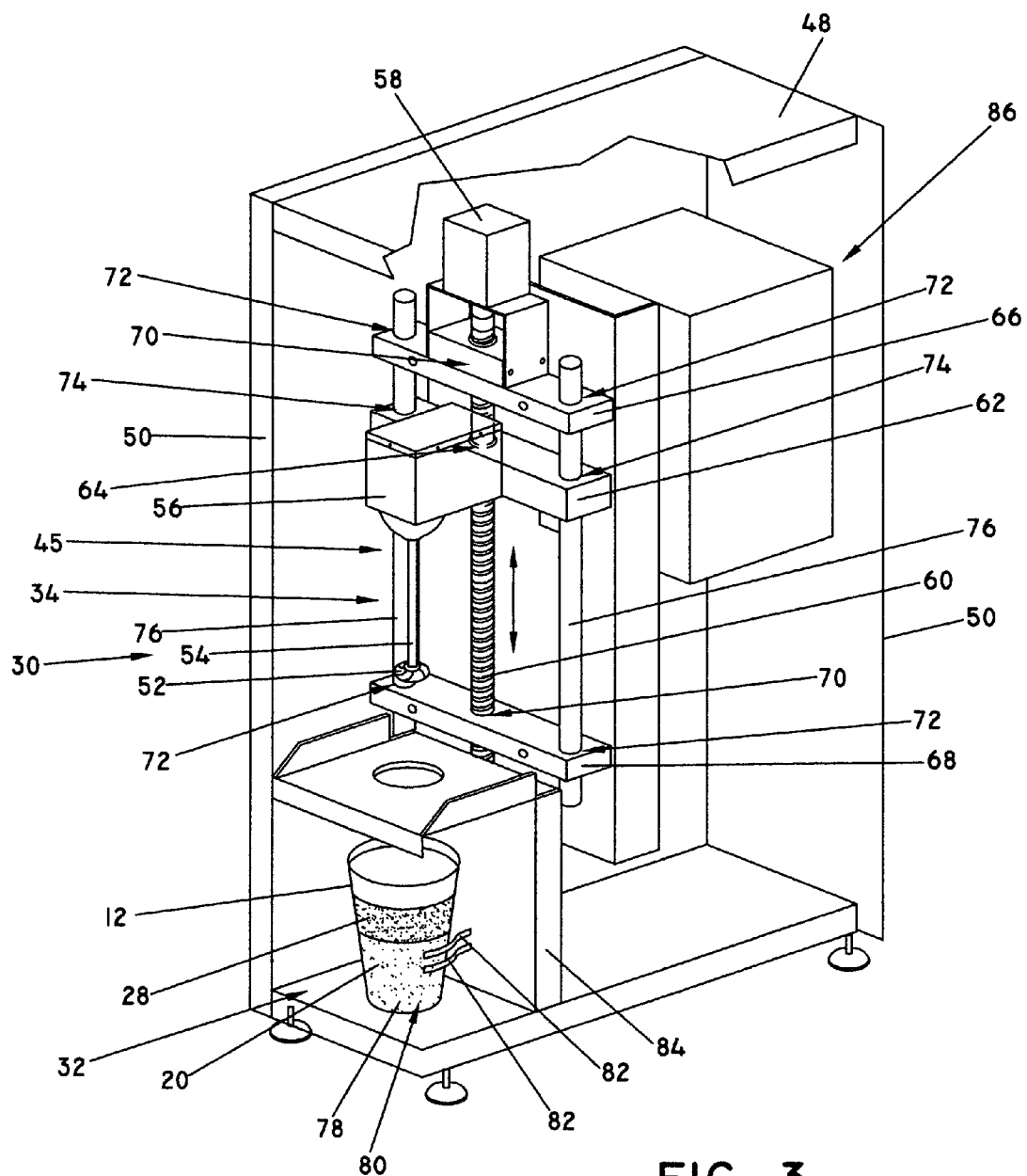
FIG. 3 is a perspective view of a beverage blending device for use with the present invention.

The beverage blending device 30 to blend the fine frozen particles of water 20 and the flavored liquid beverage mix 28 into the substantially uniform frozen slurry beverage 10 to a predetermined consistency includes the beverage blending station 32 and blending implement 34 and a blender positioning mechanism generally indicated as 45 to selectively position the blending implement 34 as shown in FIG. 3.

The beverage blending device 30 comprises a cabinet including a frame or housing including a base 46 and top or cover 48 disposed in spaced relationship relative to each other by at least one substantially vertical wall or frame support 50.

The blending implement 34 comprises a lower blender blade 52 and an intermediate substantially vertical coupler member or blender shaft 54 attached to a blender motor 56 coupled to a power source (not shown) to selectively rotate the blender blade 52 and intermediate substantially vertical coupler member or blender shaft 54 during the blending process. The blender motor 56 is affixed to the blender positioning mechanism 45 as described more fully hereinafter to selectively move the blender motor 56 and blending implement 34 vertically relative to the disposable drink container or cup 12 containing the fine frozen particles of water 20 and the flavored liquid beverage mix 28 when placed on the blending beverage station 32. Specifically, the blender positioner mechanism 45 moves the blender blade 52 vertically into the disposable drink cup or container 12 and oscillates vertically up and down within the fine frozen particles of water 20 and the flavored liquid beverage mix 28 to mix and blend the beverage components into the substantially uniform frozen slurry beverage 10 to a smooth predetermined consistency.

The blender positioner mechanism 45 comprises a positioner motor 58 attached to the top or cover 48 of the cabinet coupled to a power source (not shown) to selectively rotate a substantially vertical externally threaded screw member or shaft positioner 60 and a positioning member 62 including an internally threaded aperture 64 to selectively move the positioning member 62, blender motor 56 and blender implement 34 vertically relative to the blending beverage station 32. The blender motor 56 is attached to the positioning member 62.

The blender positioner mechanism 45 further includes a positioner guide to guide the vertical movement of the positioner member 62, blender motor 56 and blending implement 34. In particular, the positioner guide comprises an upper and lower substantially parallel substantially horizontal guide member indicated as 66 and 68 respectively each including a centrally disposed aperture 70 to operatively receive the substantially vertical externally threaded screw member or positioner shaft 60 therethrough and a pair of substantially parallel, substantially vertical cylindrical guide members each indicated as 72 attached to corresponding end portions of the upper and lower substantially parallel substantially horizontal guide members 66 and 68. The positioner member 62 includes a circular guide aperture 74 formed through each end portion thereof to slideably receive a corresponding substantially parallel, substantially vertical cylindrical guide member 76 therethrough to guide the vertical movement of the blender implement 34 and blender motor 56 attached to the positioner member 62. Of course, the substantially parallel, substantially vertical guide member 72 and guide apertures 74 may have corresponding rectilinear or other corresponding shapes.

The blending station 32 comprises a support surface 78 and a retainer recess 80 to receive and support the lower portion of a disposable drink container or cup 12 containing the fine frozen particles of water 20 and the flavored liquid beverage mix 28 to be mixed or blended into the substantially uniform frozen slurry beverage 10 of a predetermined consistency or viscosity. In addition, at least one flexible retainer element or arm 82 may be attached to a partial wall 84 to grip or hold the side of the disposable drink container or cup 12 when supported on the support surface 78.

The cabinet may comprise an enclosure having an automated wash device 86 disposed therein to periodically wash the interior thereof automatically.

The method of the present invention comprises the steps of:
supplying water to the ice making device 14 through the water supply conduit 44,
creating fine frozen particles of water of ice flakes 20 within the ice making device 14,
compressing the ice flakes 20 into ice nuggets within the ice making device 14,
placing a disposable drink container or cup 12 on the ice dispensing station 16 of the ice maker device 14 beneath the ice dispenser, nozzle 18,
dispensing a predetermined quantity or amount of fine frozen particles of water 20 from the ice dispensing nozzle 18 into the disposable drink container or cup 12,
removing the disposable drink container or cup 12 containing the predetermined quantity or amount of fine frozen particles of water 20 from the ice dispensing station 16,
placing the disposable drink container or cup 12 containing the predetermined quantity or amount of fine frozen particles of water 20 on the liquid beverage mix station 24 of the liquid beverage mix device 22 beneath the liquid beverage mix dispensing nozzle 26,
dispensing a predetermined quantity or amount of flavored liquid beverage mix 28 from the liquid beverage mix dispensing nozzle 26 into the disposable drink container or cup 12 containing the predetermined quantity or amount of fine frozen particles of water 20,
removing the disposable drink container or cup 12 containing the unmixed predetermined quantities or amounts of fine frozen particles of water 20 and flavored liquid beverage mix 28 from the liquid beverage mix station 24 of the liquid beverage mix device 22,
placing the disposable drink container or cup 12 containing the unmixed predetermined quantities or amounts of fine frozen particles of water 20 and flavored liquid beverage mix 28 on the beverage blending station 32 of the beverage blending device 30,
securing the disposable drink container or cup 12 containing the unmixed predetermined quantities or amounts of fine frozen particles of water 20 and flavored liquid beverage mix 28 on the beverage blending station 32 of the beverage blending device 30,
rotating the blender blade 52 of the beverage blending device 30,
lowering the rotating blender blade 52 of the beverage blending device 30 into the interior of the disposable drink container or cup 12 and into the unmixed predetermined quantities or amounts of fine frozen particles of water 20 and flavored liquid beverage mix 28,
oscillating the rotating blender blade 52 of the beverage blending device 30 vertically within the disposable drink container or cup 12 containing the unmixed predetermined quantities or amounts of fine frozen particles of water 20 and flavored liquid beverage mix 28 through the interface therebetween to thoroughly mix the unmixed predetermined quantities or amounts of fine frozen particles of water 20 and flavored liquid beverage mix 28 together into a substantially uniform frozen slurry beverage of a predetermined consistency, raising the rotating blender blade 52 of the beverage blending device 30 above the disposable drink container or cup 12 containing the substantially uniform frozen slurry beverage of a predetermined consistency and, removing the disposable drink container or cup 12 with the substantially uniform frozen slurry beverage 10 from the beverage blending station 32 of the beverage blending device 30.

As previously described, the fine frozen particles of water of the present invention preferably comprises ice flakes of about 85 percent ice or frozen water by weight with the remainder unfrozen water or ice nuggets of about 93 percent ice or frozen water by weight with the remainder unfrozen water.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A method for preparing a single serving frozen beverage in a single serving disposable drink container in which said beverage is both blended and served, said method comprising:

preparing a supply of ice flakes that comprise from about 81 percent ice or frozen water to about 89 percent ice or frozen water by weight with the remainder unfrozen water or preparing ice nuggets comprising from about 89 percent ice or frozen water to about 97 percent ice or frozen water by weight with the remaining unfrozen water, dispensing a predetermined quantity of said ice flakes or ice nuggets into said single serving disposable drink container, dispensing a predetermined quantity of flavorings into said single serving disposable drink container, blending said ice flakes or ice nuggets and said flavorings by a blender that comprises a blender blade and a blender shaft that is attached to a blender motor to selectively rotate the blender blade, and wherein the blender blade oscillates vertically relative to the single serving disposable drink container, thereby reducing the ice to a finely divided state forming a substantially uniform frozen slurry beverage of a predetermined consistency, wherein the blending step blends said ice flakes or said ice nuggets and said flavorings in said single serving disposable drink container whereby a ring around a top that would extend a height of said single serving drink container is avoided, and securing said single serving disposable drink container during the dispensing and/or blending steps, said single serving disposable drink container being received by a retainer recess and a support surface, said retainer recess receiving and supporting only a lower portion of said single serving disposable drink container.

2. The method of claim 1 wherein the ice flakes comprise about 85 percent ice or frozen water by weight with the remainder unfrozen water.

3. The method of claim 1 wherein the ice nuggets comprise about 93 percent ice or frozen water by weight with the remainder unfrozen water.

4. The method of claim 1 further includes securing said single serving disposable drink container containing said flavorings or amounts of said ice flakes or ice nuggets and said flavorings before activating said rotating blender blade.

5. The method of claim 1 wherein the rotating blender blade oscillates vertically within the single serving disposable drink container containing said ice flakes or ice nuggets and said flavorings through an interface therebetween to thoroughly blend said ice flakes or ice nuggets and said flavorings together into said substantially uniform frozen slurry beverage of said predetermined consistency.

6. The method of claim 1, wherein the said single serving disposable drink container is greater than two thirds full.

7. The method of claim 1, wherein said flavorings comprise solid particles.

8. The method of claim 1, wherein said flavorings are selected from the group consisting of fruit puree, coffee, liquor, and dairy products.

9. A method for preparing a single serving frozen beverage in a single serving disposable drink container in which said beverage is both blended and served, said method comprising:

preparing a supply of ice flakes that comprise from about 81 percent ice or frozen water to about 89 percent ice or frozen water by weight with the remainder unfrozen water or preparing ice nuggets comprising from about 89 percent ice or frozen water to about 97 percent ice or frozen water by weight with the remaining unfrozen water, dispensing a predetermined quantity of said ice flakes or ice nuggets into said single serving disposable drink container, dispensing a predetermined quantity of flavorings into said single serving disposable drink container, and blending said ice flakes or ice nuggets and said flavorings by a blender that comprises a blender blade and a blender shaft that is attached to a blender motor to selectively rotate the blender blade, and wherein the blender blade oscillates vertically relative to the single serving disposable drink container, thereby reducing the ice to a finely divided state forming a substantially uniform frozen slurry beverage of a predetermined consistency, wherein the blender motor is affixed to a blender positioning mechanism, and wherein the blender positioner mechanism has a positioner motor to selectively rotate an externally threaded screw member and a positioning member including an internally threaded aperture to selectively move the positioning member and blender motor vertically.

10. The method of claim 9, wherein the method blends in a container that consists of said single serving disposable drink container.

11. The method of claim 9, wherein said single serving disposable drink container has a side that is held by at least one flexible retainer element.

12. The method of claim 9, wherein said single serving disposable drink container has a side that is not held.

* * * * *